(12) United States Patent
Abe

(10) Patent No.: US 9,632,497 B2
(45) Date of Patent: Apr. 25, 2017

(54) MACHINING-PROGRAM GENERATING APPARATUS, MACHINING-PROGRAM GENERATING METHOD, AND RECORDING MEDIUM

(75) Inventor: Daiki Abe, Aichi (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 343 days.

(21) Appl. No.: 14/373,688

(22) PCT Filed: Apr. 27, 2012

(86) PCT No.: PCT/JP2012/061453
§ 371 (c)(1),
(2), (4) Date: Jul. 22, 2014

(87) PCT Pub. No.: WO2013/161082
PCT Pub. Date: Oct. 31, 2013

(65) Prior Publication Data
US 2014/0364992 A1 Dec. 11, 2014

(51) Int. Cl.
*G05B 19/4097* (2006.01)
*B23H 7/20* (2006.01)
(Continued)

(52) U.S. Cl.
CPC ........... *G05B 19/4097* (2013.01); *B23H 1/02* (2013.01); *B23H 7/20* (2013.01);
(Continued)

(58) Field of Classification Search
USPC ....................................................... 700/162
See application file for complete search history.

(56) References Cited

U.S. PATENT DOCUMENTS

| 4,746,782 A | 5/1988 | Weber |
| 5,038,011 A | 8/1991 | Nakayama |

(Continued)

FOREIGN PATENT DOCUMENTS

| DE | 3909252 A1 | 10/1989 |
| DE | 4114510 A1 | 11/1992 |

(Continued)

OTHER PUBLICATIONS

Communication dated Jul. 29, 2015, issued by the German Patent Office in counterpart German Application No. 112012006048.2.

(Continued)

*Primary Examiner* — Kidest Bahta
(74) *Attorney, Agent, or Firm* — Sughrue Mion, PLLC; Richard C. Turner

(57) ABSTRACT

A CAM apparatus includes: an input receiving unit that receives designation of a part where core fixing machining is performed in a machining shape forming a core and divides the machining shape into a first machining shape element for which the core fixing machining is performed and a second machining shape element, which is connected to the first machining element and for which the core fixing machining is not performed, a machining-condition setting unit that allocates a first electric condition for the core fixing machining to the first machining shape element and allocates a second electric condition to the second machining shape element, and a machining-program generating unit that generates a machining program for machining the second machining shape element under the second electric condition and continuously machining the first machining shape element under the first electric condition after the machining of the second machining shape element.

9 Claims, 13 Drawing Sheets

(51) Int. Cl.
  *B23H 1/02* (2006.01)
  *G05B 19/4093* (2006.01)
  *B23H 7/06* (2006.01)

(52) U.S. Cl.
  CPC .......... *G05B 19/40931* (2013.01); *B23H 7/06* (2013.01); *G05B 2219/31001* (2013.01); *G05B 2219/36318* (2013.01); *G05B 2219/45043* (2013.01); *G05B 2219/45221* (2013.01); *Y02P 90/265* (2015.11)

(56) References Cited

U.S. PATENT DOCUMENTS

| | | | |
|---|---|---|---|
| 5,386,093 A | | 1/1995 | Borsari |
| 5,859,401 A | * | 1/1999 | Kajitori ............... B23H 7/02 219/69.12 |
| 6,803,537 B2 | * | 10/2004 | Hattori ............... B23H 7/065 219/69.12 |
| 7,465,898 B2 | * | 12/2008 | Kaneko ............... B23H 7/04 219/69.12 |
| 8,653,401 B2 | * | 2/2014 | Inaba ............... B23H 7/20 219/69.12 |
| 9,085,037 B2 | * | 7/2015 | Yamaoka ............... B23H 1/02 |
| 2010/0187204 A1 | * | 7/2010 | Angelella ............... B23H 7/065 219/69.13 |

FOREIGN PATENT DOCUMENTS

| | | |
|---|---|---|
| JP | 57-096724 A | 6/1982 |
| JP | 61-61718 A | 3/1986 |
| JP | 62-218024 A | 9/1987 |
| JP | 01-127226 A | 5/1989 |
| JP | 03-270822 A | 12/1991 |
| JP | 04-025320 A | 1/1992 |
| JP | 06-071518 A | 3/1994 |
| JP | 06-110524 A | 4/1994 |
| JP | 2006-320999 A | 11/2006 |
| JP | 2008-100338 A | 5/2008 |
| JP | 2009-037607 A | 2/2009 |

OTHER PUBLICATIONS

International Search Report for PCT/JP2012/061453 dated Jul. 31, 2012 [PCT/ISA/210].

* cited by examiner

FIG.2
(a) 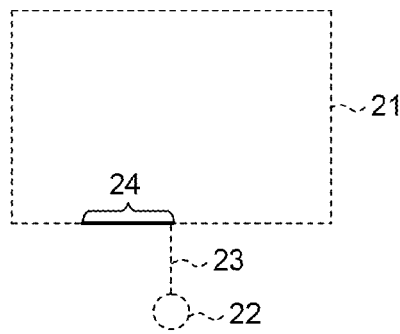
(b) 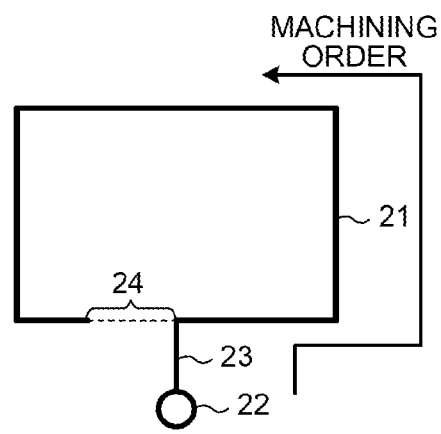
(c) 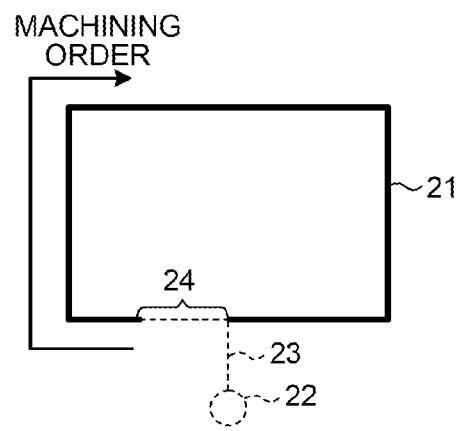
(d) 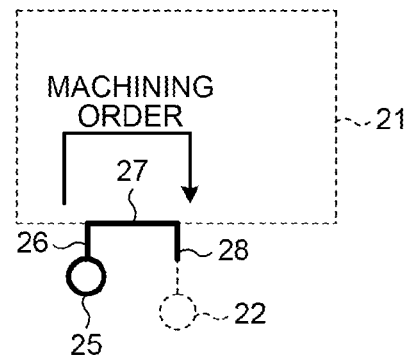

FIG.15
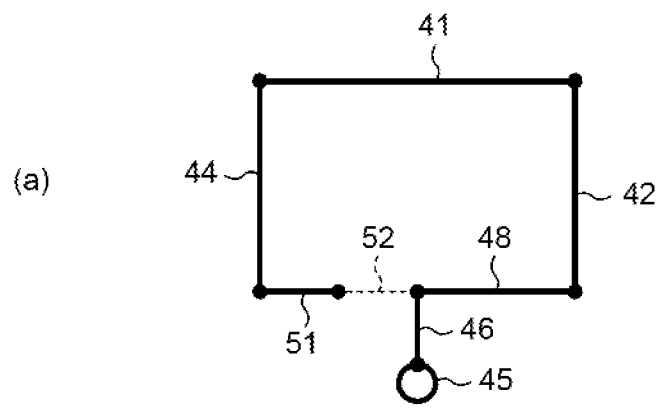
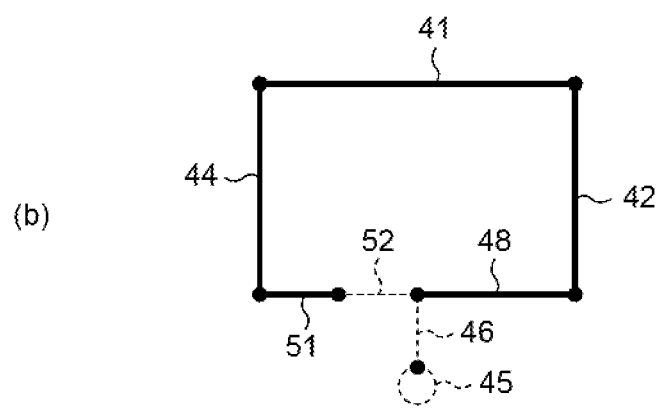
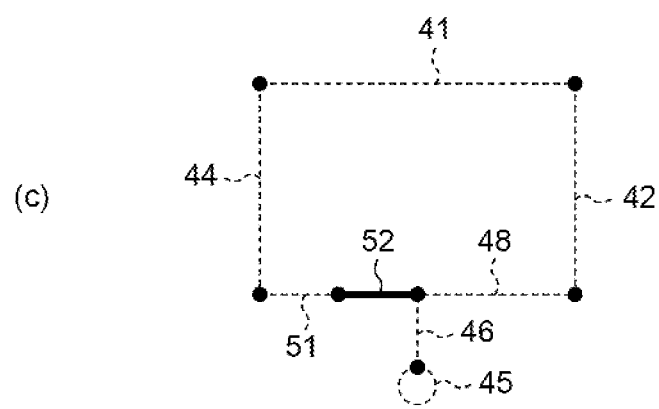

FIG.18
(a) 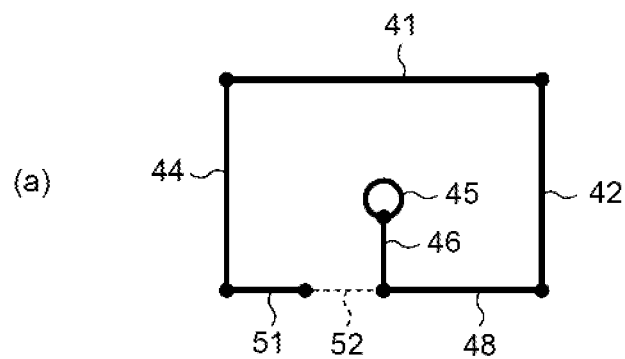
(b) 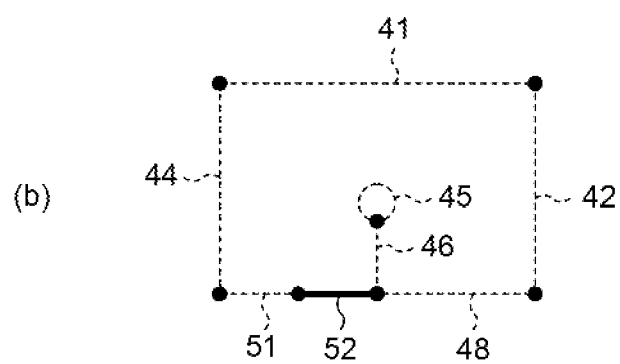
(c) 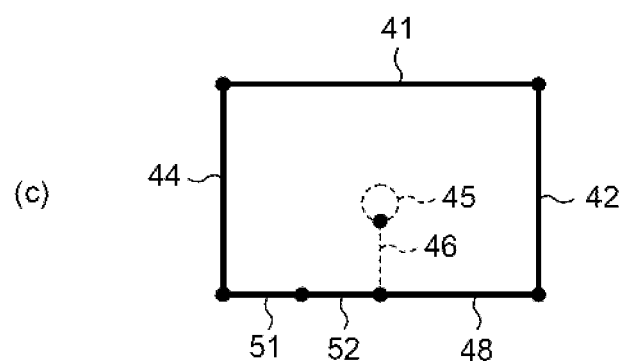

MACHINING-PROGRAM GENERATING APPARATUS, MACHINING-PROGRAM GENERATING METHOD, AND RECORDING MEDIUM

CROSS REFERENCE TO RELATED APPLICATIONS

This application is a National Stage of International Application No. PCT/JP2012/061453 filed Apr. 27, 2012, the contents of all of which are incorporated herein by reference in their entirety.

FIELD

The present invention relates to a machining-program generating apparatus and a machining-program generating method for generating an NC machining program for performing numerical machining of a wire electric discharge machining apparatus and a computer-readable recording medium having recorded therein a program for generating the NC machining program.

BACKGROUND

For a CAM (computer aided manufacturing) apparatus that generates an NC machining program for performing numerical machining of a wire electric discharge machining apparatus, there has been a CAM apparatus implemented with a "cutoff section designating" function for receiving an input for designating a part for cutting off a core. With this function, the CAM apparatus generates a machining program for once stopping machining before machining of a cutoff section and, when an input of machining resumption by an operator is performed, executing cutoff machining. The execution of the machining program is once stopped because, to prevent a core slipped down by the cutoff machining from colliding with a lower guide mechanism of the wire electric discharge machining apparatus, support in a site is necessary for the operator to collect the slipped-off core when the cutoff machining is executed.

On the other hand, as a technology for performing treatment of a core, core fixing machining for depositing an electrode component on the core and fixing the core after cutting to a cut surface is present as a publicly-known technology (see, for example, Patent Literature 1).

CITATION LIST

Patent Literature

Patent Literature 1: Japanese Patent Application Laid-Open No. S57-096724

SUMMARY

Technical Problem

The present invention has been devised in view of the above and it is an object of the present invention to obtain a machining-program generating apparatus and a machining-program generating method for generating a machining program for efficiently executing core fixing machining and a recording medium having recorded therein a program for generating the machining program for efficiently executing the core fixing machining.

Solution to Problem

In order to solve the aforementioned problems, a machining-program generating apparatus that generates a machining program for causing a wire electric discharge machining apparatus to operate is constructed to include: an input receiving unit that receives designation of a part where core fixing machining is performed in a machining shape forming a core and divides, on the basis of content of the received designation, the machining shape into machining shape elements including a first machining shape element for which the core fixing machining is performed and a second machining shape element for which the core fixing machining is not performed, the second machining shape element being connected to the first machining shape element; a machining-condition setting unit that allocates a first electric condition for the core fixing machining to the first machining shape element and allocates a second electric condition different from the first electric condition to the second machining shape element; and a machining-program generating unit that generates a machining program for machining the second machining shape element under the second electric condition and continuously machining the first machining shape element under the first electric condition after the machining of the second machining shape element.

Advantageous Effects of Invention

The machining-program generating apparatus according to the present invention does not execute a useless operation immediately before the core fixing machining. Therefore, there is an effect that it is possible to generate a machining program for efficiently executing the core fixing machining.

BRIEF DESCRIPTION OF DRAWINGS

FIG. 2 is a diagram for explaining a procedure of punching performed using a technology according to a comparative example.

FIG. 15 is a diagram of execution order of machining processes in the case of punching determined by an NC-machining-program generating unit;

FIG. 18 is a diagram of execution order of machining processes in the case of die machining determined by the NC-machining-program generating unit.

DESCRIPTION OF EMBODIMENTS

Embodiments of a machining-program generating apparatus, a machining-program generating method, and a recording medium according to the present invention are explained in detail below with reference to the drawings. Note that the present invention is not limited by the embodiment.

Embodiment

Figure 1:
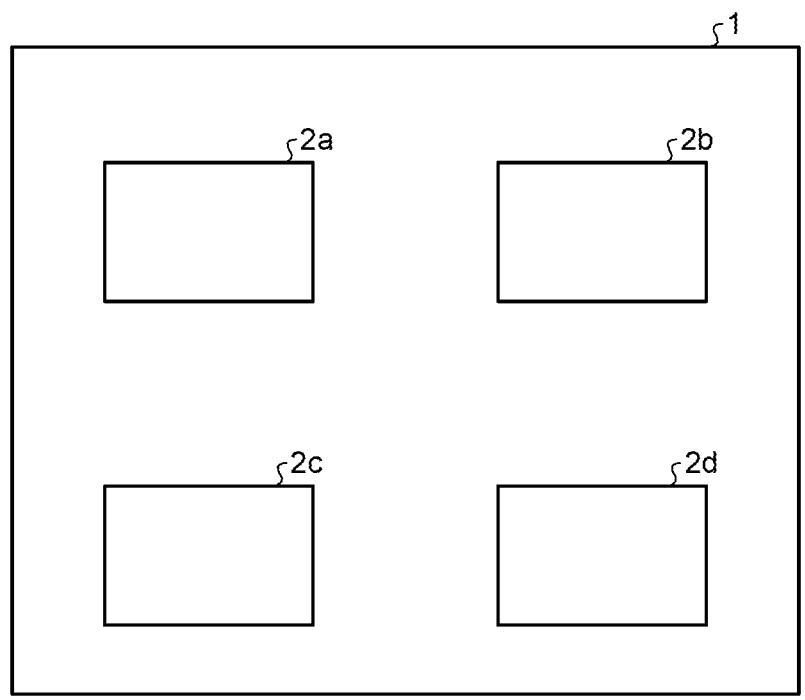
FIG. 1 is a diagram for explaining a machining example by a wire electric discharge machining apparatus.

FIG. 1 is a diagram for explaining a machining example by a wire electric discharge machining apparatus. As shown in FIG. 1, the wire electric discharge machining apparatus can perform machining for slicing out four shapes 2 (shapes 2a to 2d) from a shape 1 while retaining the shape 1 in a holding tool. When the shape 1 after the slicing-out of the shape 2 is a target shape, the machining for slicing out the shape 2 is called "die machining". When the shape 2 is a target shape, the machining for slicing out the shape 2 called "punching". Note that the shape 2, which is a shape on a sliced-out side, is called "core".

First, as a technology to be compared with the embodiment of the present invention, a technology for slicing out a core using cutoff machining (hereinafter, a technology according to a "comparative example") is explained.

Figure 3:
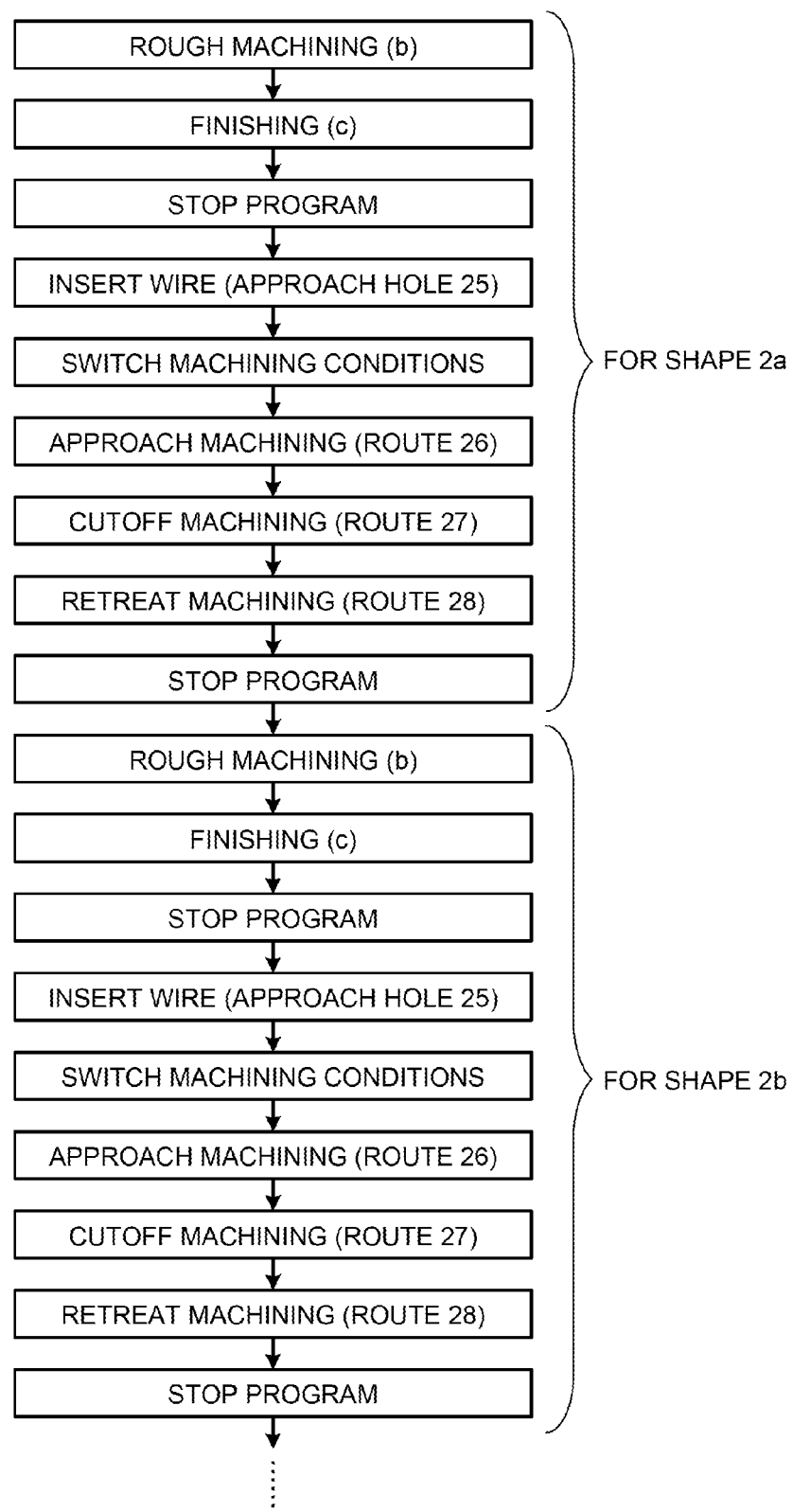
FIG. 3 is a diagram for explaining the configuration of an NC machining program for performing the punching generated using the technology according to the comparative example.

FIG. 2 is a diagram for explaining a procedure of punching performed using the technology according to the comparative example. First, as shown in (a), a rectangular machining shape 21 corresponding to the shape of the outer periphery of the shape 2, a hole through which a wire is inserted first (an initial hole 22), and an approach route 23 for approaching from the initial hole 22 to the machining shape 21 are set in a CAM apparatus. An operator can set a cutoff section 24 in a part of the machining shape 21. Then, the CAM apparatus generates an NC machining program for performing machining at steps of (b) to (d). FIG. 3 is a diagram for explaining the configuration of the NC machining program for performing the punching.

That is, in a first step, as shown in (b), rough machining is executed in a route starting from the initial hole 22, passing the approach route 23, and ending before the cutoff section 24 in the machining shape 21. Subsequently, as shown in (c), finishing is executed for a portion of the machining shape 21 excluding the cutoff section 24. For example, machining is performed on the machining shape 21 to return on the route of the machining in (b) starting from the ending point of the machining in (b) and ending at an endpoint different from the starting point among endpoints of the cutoff section 24. When the finishing shown in (c) is completed, the NC machining program stops the execution of the own program by itself and waits for an input of a resumption instruction by the operator. This is because, as explained above, support in a site by the operator is necessary for the cutoff machining of the cutoff section 24.

When the resumption instruction is input, the cutoff machining of the cutoff section is executed. That is, as shown in (d), an approach hole 25 through which a wire is inserted is opened again for the cutoff machining and the wire is inserted through the approach hole 25. Thereafter, switching of machining conditions is executed. The machining conditions are called electric conditions including a voltage applied to an electrode and wire speed. The electric conditions for the cutoff machining can be the same as, for example, electric conditions of the rough machining. After the switching of the machining conditions, approach machining is performed along a route 26 for approaching from the approach hole 25 to the cutoff section 24. Machining of the cutoff section 24 is executed along a route 27. Retreat machining is performed along a route 28 at an ending point of the cutoff section 24.

The steps of (b) to (d) are repeated by the number of cores (the shapes 2). That is, the NC machining program requires an input of the resumption instruction every time the step of (c) ends concerning each of the cores.

Figure 4:
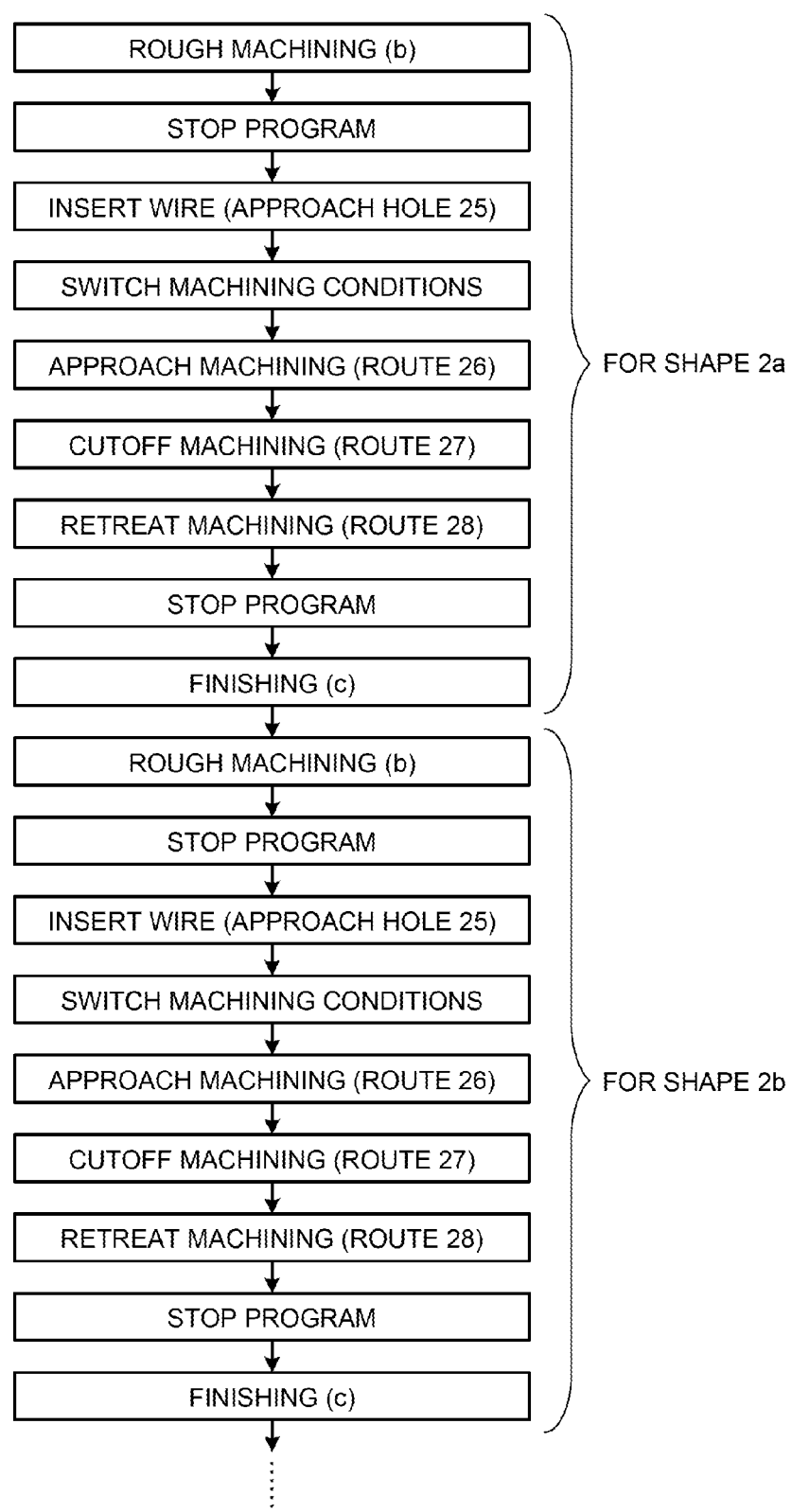
FIG. 4 is a diagram for explaining the configuration of an NC machining program for performing die machining generated using the technology according to the comparative example.

Note that, in the die machining as well, as in the punching, when the setting shown in (a) is performed, an NC machining program is generated. FIG. 4 is a diagram for explaining the configuration of the NC machining program for performing the die machining. In the case of the die machining, when the NC machining program is started to be executed, after the step of (b) is executed, the NC machining program stops the execution of the own program. When a resumption instruction is input, the cutoff machining shown in (d) is executed, and the execution of the program is stopped again. After the operator collects a core, a resumption instruction is input by the operator. Finally, the finishing shown in (c) is executed. In the case of the die machining as well, as in the punching, the steps of (b) to (d) are repeated by the number of cores (the shapes 2). That is, the NC machining program requires an input of the resumption instruction every time the step of (c) ends and the step of (d) ends concerning the respective cores. Note that, in the die machining, the initial hole 22, the route 23, the approach hole 25 for the cutoff machining, the route 26, and the route 28 are generated on the shape 2 side. In the case of the die machining, at the step of (c), the entire periphery of the machining shape 21 after the cutoff of the core may be subjected to the finishing.

In this way, according to the technology concerning the comparative example, the CAM apparatus automatically generates the NC machining program that temporarily stops for each of cores. Therefore, even if the NC machining program generated by the CAM apparatus to which the technology according to the comparative example is applied is diverted and a section set as the cutoff section is changed to setting for performing core fixing machining, the NC machining program temporarily stops for each of cores before and after the core fixing machining. With the core fixing machining, slip-off the core is prevented. Therefore, a stop for supporting the operator is considered to be a useless operation at least when the punching is executed. The core fixing machining is realized simply by changing the machining conditions for the rough machining and the finishing. Therefore, the approach machining performed before the core fixing machining and the retreat machining performed after the core fixing machining are useless machining. The machining-program generating apparatus in the embodiment of the present invention can generate an NC machining program for not executing the useless operations explained above as much as possible.

Figure 5:
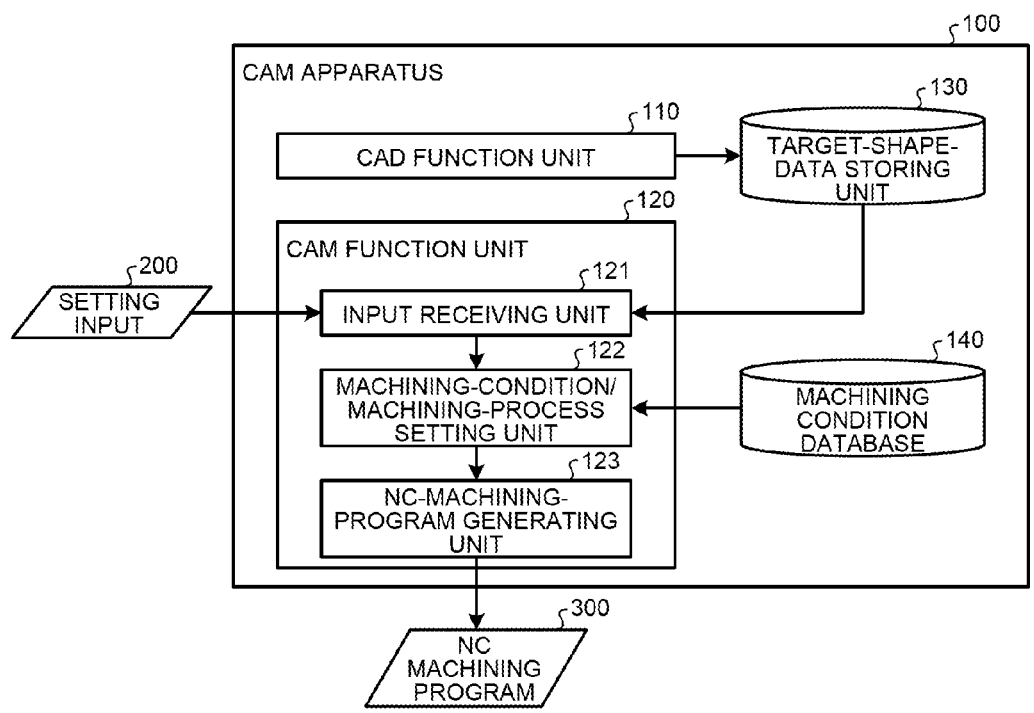
FIG. 5 is a diagram of the functional configuration of a CAM apparatus applied with a machining-program generating apparatus in an embodiment of the present invention.

FIG. 5 is a diagram of the functional configuration of a CAM to which the machining-program generating apparatus in the embodiment of the present invention is applied. As shown in the figure, a CAM apparatus 100 includes a CAD (computer aided design) function unit 110, a CAM function unit 120, a target-shape-data storing unit 130, and a machining condition database 140.

The CAD function unit 110 performs support of generation of a drawing data (target shape data) in which a target shape is described. An operator can generate the target shape data by operating the CAD function unit 110. The target shape data is stored in the target-shape-data storing unit 130. Note that the target shape data may be externally input and stored in the target-shape-data storing unit 130. That is, in this embodiment, implementation of the CAD function unit 110 is not essential.

The CAM function unit 120 includes an input receiving unit 121, a machining-condition/machining-process setting unit 122, and an NC-machining-program generating unit 123.

The input receiving unit 121 executes readout of the target shape data from the target-shape-data storing unit 130 and reception of a setting input 200 input from the operator. Contents input by the setting input 200 include designation of a part where the core fixing machining is performed (core fixing machining part designation), designation of a machining part of an initial hole, designation of an approach route, and designation of a machining type indicating whether machining is the punching or the die machining.

The machining-condition/machining-process setting unit 122 generates, on the basis of the contents input to the input receiving unit 121 and the target shape data, list information in which a machining process is described for each of machining shape elements. Note that the machining shape information means respective line segments forming a machining route. The machining process means a process in which one machining attribute is set for the machining shape element. As the machining attributes, there are rough machining, finishing, and core fixing machining.

The machining condition database 140 is a database in which electric conditions are registered for each of the machining attributes. The machining-condition/machining-process setting unit 122 associates, with the respective machining processes forming the list information, the electric conditions corresponding thereto registered in the machining condition database 140, and inputs the list information after the association to the NC-machining-program generating unit 123.

The NC-machining-program generating unit 123 determines execution order of the machining processes on the basis of the input list information. The NC-machining-program generating unit 123 then generates an NC machining program 300 for executing the respective machining processes in the determined execution order and outputs the NC machining program 300 to the wire electric discharge machining apparatus. Note that the NC machining program 300 can be output to the wire electric discharge machining apparatus for each of blocks. In the wire electric discharge machining apparatus, the thus sent program blocks may be sequentially executed.

Figure 6:
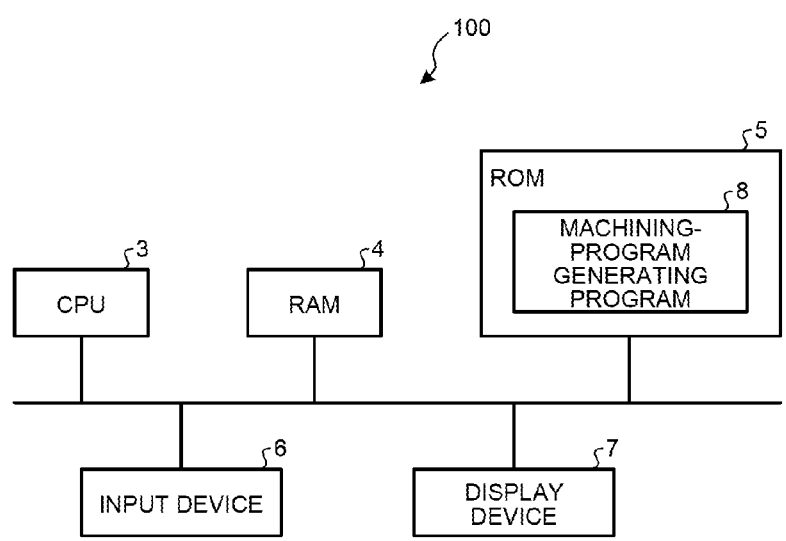
FIG. 6 is a diagram of a hardware configuration example of the CAM apparatus in the embodiment of the present invention.

FIG. 6 is a diagram of a hardware configuration example of the CAM apparatus 100. The CAM apparatus 100 includes a CPU (Central Processing Unit) 3, a RAM (Random Access Memory) 4, a ROM (Read Only Memory) 5, an input device 6, and a display device 7. The CPU 3, the RAM 4, the ROM 5, the input device 6, and the display device 7 are connected to one another via a bus line.

The display device 7 is a device capable of displaying information such as a liquid crystal monitor and the like. The display device 7 displays output information to the operator. The input device 6 includes, for example, a mouse and a keyboard. Operation information of the CAM apparatus 100 and the setting input 200 from the operator are input to the input device 6. The input various kinds of information are sent to the CPU 3.

The ROM 5 is a recording medium having recorded therein a machining-program generating program 8 for realizing automatic generation of a machining program. The CPU 3 reads out the machining-program generating program 8 from the ROM 5 via the bus line, loads it to the RAM 4, and executes the machining-program generating program 8 loaded in the RAM 4. The machining-program generating program 8 is loaded to the RAM 4, whereby a CAD function unit 110 and a CAM function unit 120 are generated on the RAM 4. The RAM 4 includes, apart from a program developing region for the machining-program generating program 8, a work area for storing intermediate data generated according to the execution of the machining-program generating program 8. For example, the list information of the machining processes corresponds to the intermediate data. The target-shape-data storing unit 130 and the machining condition database 140 are realized by securing regions corresponding to the RAM 4, the ROM 5, or a not-shown external storage device.

Note that the machining-program generating program 8 can be configured to be provided or distributed through a network such as the Internet. Instead of the ROM 5, any recording medium can be adopted as a recording medium functioning as a load source of the machining-program generating program 8 as long as the recording medium is a non-temporary tangible medium. For example, an external storage device, a detachable memory device, an optical disk device, and the like can be adopted.

Figure 7:
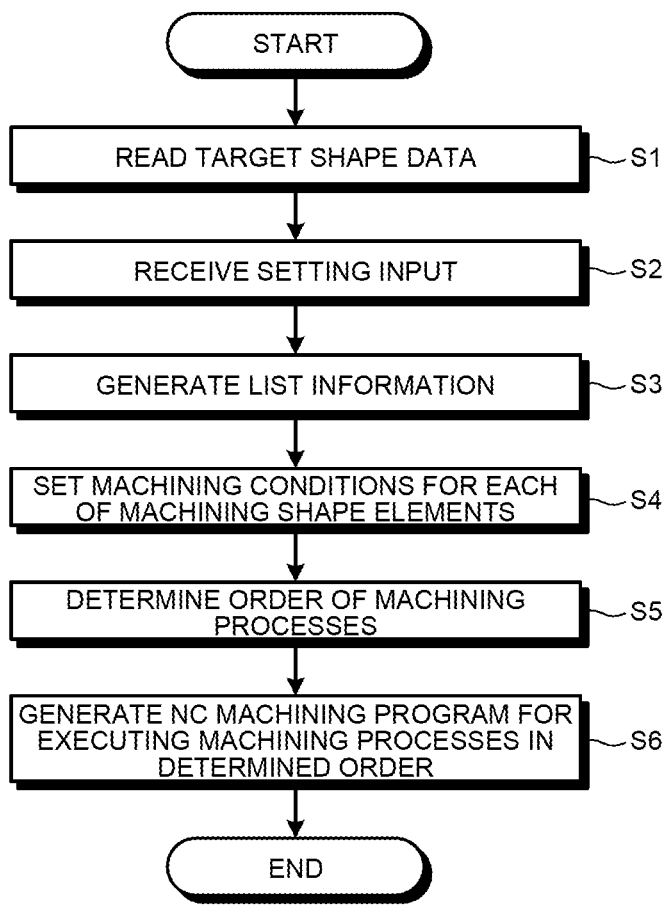
FIG. 7 is a flowchart for explaining a method in which the CAM apparatus in the embodiment of the present invention generates an NC machining program.

Next, a method in which the CAM apparatus 100 in the embodiment of the present invention generates the NC machining program 300 is explained. FIG. 7 is a flowchart for explaining the method in which the CAM apparatus 100 generates the NC machining program 300. It is assumed that the target shape data is already created and stored in the target-shape-data storing unit 130.

Figure 8:
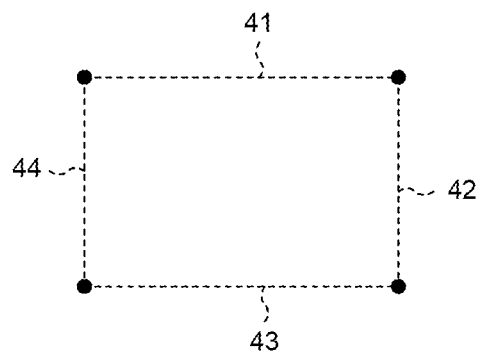
FIG. 8 is a diagram for explaining a state in which a machining shape element is generated from a target shape.

As shown in FIG. 7, the input receiving unit 121 reads the target shape data stored in the target-shape-data storing unit 130 (step S1). Note that the input receiving unit 121 generates a machining shape element on the basis of a target shape rendered in the read target shape data. Specifically, the input receiving unit 121 disassembles the target shape into line segments and sets the respective line segments as machining shape elements. For example, as shown in FIG. 8, the shape 2 is disassembled into machining shape elements (machining shape elements 41 to 44).

Figure 9:
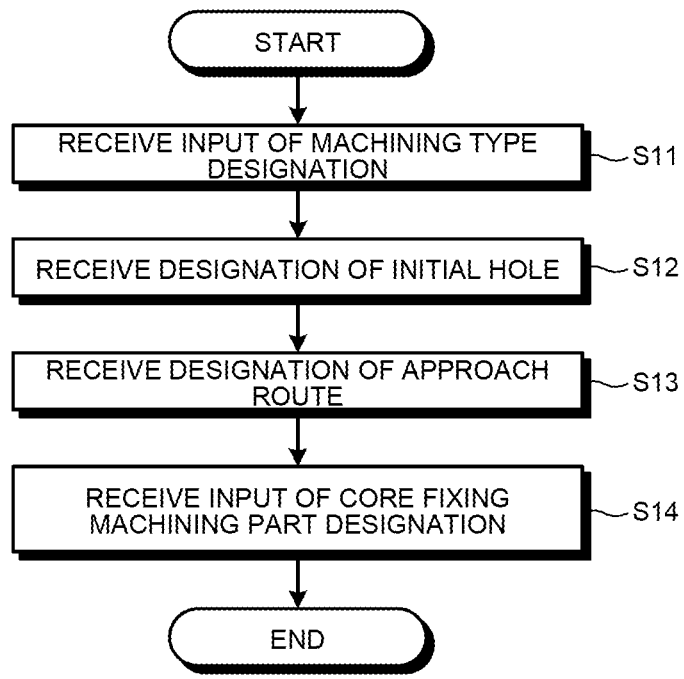
FIG. 9 is a flowchart for explaining reception processing for a setting input more in detail.

Thereafter, the input receiving unit 121 performs reception of the setting input 200 (step S2). FIG. 9 is a flowchart for explaining the reception processing for the setting input more in detail. As shown in the figure, the input receiving unit 121 receives an input for designating a machining type (step S11). It is assumed that an input for designating the punching has been input. Subsequently, the input receiving unit 121 receives an input for designating a position of an initial hole (step S12). The position of the initial hole may be designated by designation of a coordinate value or may be designated by displaying the target shape on the display device 7 and designating a position on the target shape with a pointing device.

Figure 10:
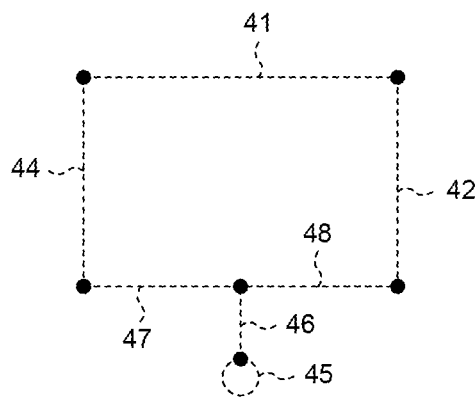
FIG. 10 is diagram for explaining a state in which an initial hole and an approach route are generated and the machining shape element is divided.

Subsequently, the input receiving unit 121 receives an input of designation of an approach route (step S13). The approach route can be designated by designation of, for example, a machining shape element at an approach destination. It is assumed that the machining shape element 43 is designated as the machining shape element at the approach destination. Then, as shown in FIG. 10, the input receiving unit 121 generates a machining shape element 45 corresponding to the initial hole and a machining shape element 46 corresponding to the approach route and divides the machining shape element 43 into two machining shape elements 47 and 48 at an intersection of the approach route and the machining shape element 43.

Figure 11:
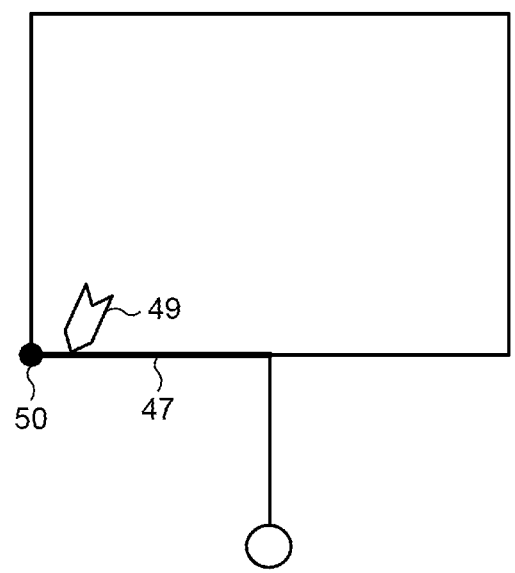
FIG. 11 is a diagram of a display screen example for receiving designation of a core fixing machining part.
Figure 12:
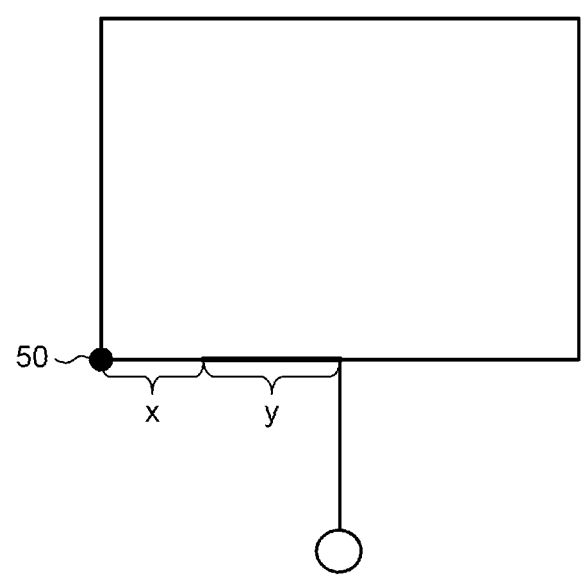
FIG. 12 is a diagram for explaining a setting example of a distance x and a section y.
Figure 13:
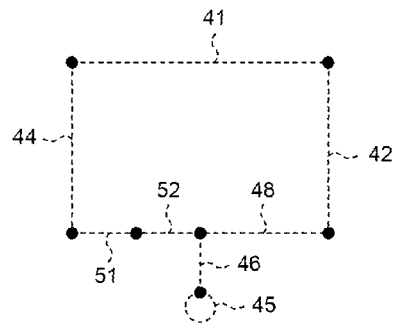
FIG. 13 is a diagram for explaining a state in which the machining shape element is divided into a section designated as the core fixing machining part and a section not designated as the core fixing machining part.

Subsequently, the input receiving unit 121 receives an input of designation of a core fixing machining part (step S14). The core fixing machining part is designated, for example, as explained below. That is, first, a machining shape element for which the core fixing machining is performed is designated by the pointing device. FIG. 11 is a diagram of a display screen example for receiving designation of the core fixing machining part. In the figure, a display screen example is shown in a state in which a cursor 49 is placed on a line segment corresponding to the machining shape element 47 of the shape 2 and the line segment has been clicked. Consequently, an endpoint 50 of the machining shape element 47 on a side close to the cursor during the click is set as a reference point of the line segment. A distance x from the reference point to the core fixing machining part and a section y where the core fixing machining is performed are input. FIG. 12 is a diagram for explaining a setting example of the distance x and the section y. As shown in the figure, it is assumed that a section from a halfway part of the machining shape element 47 to an endpoint on a side different from the reference point 50 among endpoints of the machining shape element 47 is designated as the core fixing machining part. Then, as shown in FIG. 13, the input receiving unit 121 divides the machining shape element 47 into a machining shape element 52 related to the section designated as the core fixing machining part and a machining shape element 52 related to a section not designated as the machining shape element 51.

Figure 14:
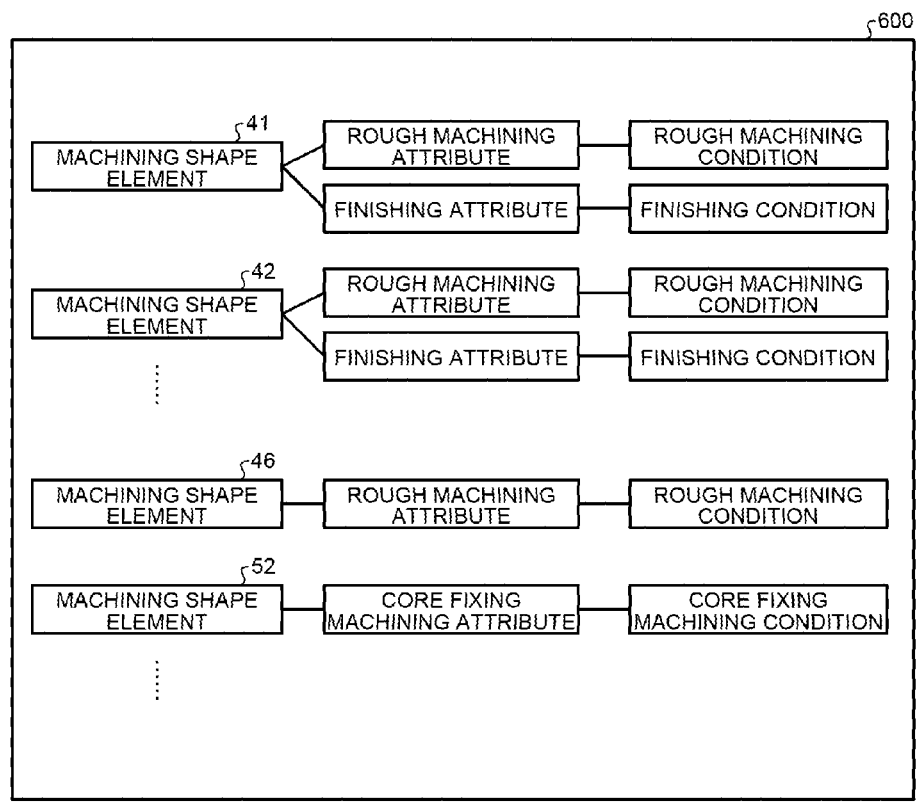
FIG. 14 is a diagram for explaining a data structure example of list information in which machining conditions are set.

When the processing at step S14 is completed, the machining-condition/machining-process setting unit 122 generates list information (step S3) and sets, in machining processes forming the generated list information, the machining conditions registered in the machining condition database 140 (step S4). FIG. 14 is a diagram for explaining a data structure example of the list information in which the machining conditions are set. As shown in the figure, list information 600 has a data structure in which it is described that one or more attributes are set for each of machining shape elements. A method of setting the attributes can be any method. For example, when the punching is designated, for machining shape elements (i.e., the machining shape elements 42 to 44, 48, and 51) not designated as the core fixing machining part among the machining shape elements forming the shape 2, both of the rough machining attribute and the finishing attribute are set. The core fixing machining attribute is set for the machining shape element 52 designated as the core fixing machining part. The rough machining attribute is set for the machining shape element 46 corresponding to the approach route. When the rough machining attribute and the finishing attribute are set for one machining shape element, this indicates that a machining process of the rough machining and a machining process of the finishing are executed for the machining shape element. Note that, with the list information 600 shown in the figure, the machining condition corresponding to the machining shape element read out from the machining condition database 140 is associated with the machining shape element for each of the machining attributes according to the processing at step S4.

Subsequently, the NC-machining-program generating unit 123 determines execution order of the machining processes on the basis of the list information 600 in which the setting of the machining conditions is described (step S5). The core fixing machining can be realized simply by switching the machining conditions to the machining conditions for the core fixing machining when the wire reaches the core fixing machining part. Therefore, the NC-machining-program generating unit 123 generates the NC machining program 300 to, after machining the machining shape element 51, which is a machining shape element that is connected to the machining shape element 52 designated as the core fixing machining part and is not designated as the core fixing machining unit, subsequently subject the machining shape element 52 to the core fixing machining. That is, the NC machining program 300 does not execute approach machining and a temporary stop before the core fixing machining. Specifically, when the punching is designated, the NC-machining-program generating unit 123 selects a shortest route and determines execution order of the machining processes such that machining can be performed in the order of, for example, the rough machining, the finishing, the machining condition switching, and the core fixing machining.

FIG. 15 is a diagram of execution order of machining processes in the case of the punching determined by the NC-machining-program generating unit 123. First, as shown in (a), a machining process is executed starting from the machining shape element 45 corresponding to the initial hole to perform the rough machining in the order of the machining shape element 46, the machining shape element 48, the machining shape element 42, the machining shape element 41, the machining shape element 44, and the machining shape element 51. Subsequently, as shown in (b), a machining process is executed to perform the finishing in the order of the machining shape element 51, the machining shape element 44, the machining shape element 41, the machining shape element 42, and the machining shape element 48. Finally, after the machining conditions are switched to the core fixing machining, a machining process for subjecting the machining shape element 52 to the core fixing machining is executed.

Figure 16:
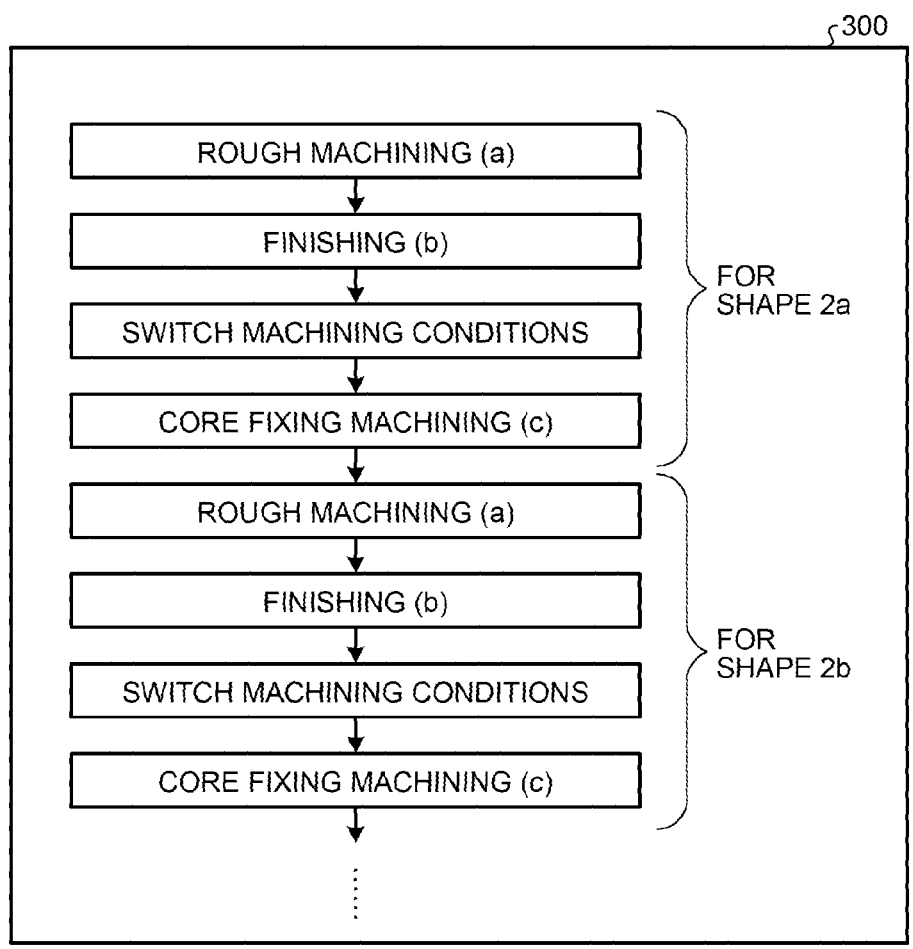
FIG. 16 is a diagram of an NC machining program for executing the punching.

Subsequently, the NC-machining-program generating unit 123 generates the NC machining program 300 for executing the machining processes in the determined execution order (step S6) and ends the operation. FIG. 16 is a diagram of the NC machining program 300 for executing the punching. As shown in the figure, with the NC machining program 300, a series of machining processes for, after the rough machining and the finishing, switching the machining conditions and performing the core fixing machining are executed for each of the shapes 2. That is, the approach machining and the retreat machining for the core fixing machining are omitted, and before the execution of the core fixing machining, the NC machining program 300 does not change to a stop state and the machining is performed. Therefore, it is possible to efficiently perform the punching compared with the NC machining program generated by the technology according to the comparative example.

Machining processes performed when the die machining is designated are explained.

Figure 17:
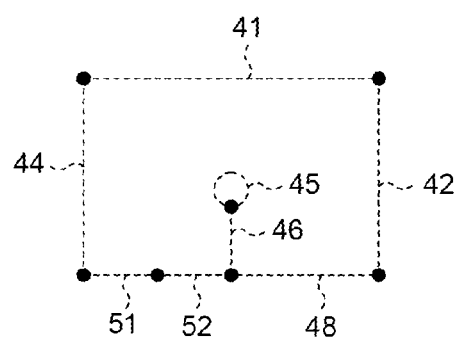
FIG. 17 is a diagram of the configuration of a final machining shape element obtained when die machining is designated.

FIG. 17 is a diagram of the configuration of final machining shape elements formed when the die machining is designated. As shown in the figure, when the die machining is designated, the machining shape element 45 corresponding to the initial hole and the machining shape element 46 corresponding to the approach route are set on the shape 2 side rather than on the shape 1 side by the input receiving unit 121.

When the die machining is designated, the NC-machining-program generating unit 123 selects a shortest route among routes for performing machining for each of cores in the order of the rough machining, the machining condition switching, and the core fixing machining, and determines execution order of machining processes.

FIG. 18 is a diagram of execution order of machining processes in the case of the die machining determined by the NC-machining-program generating unit 123. First, as shown in (a), a machining process is executed starting from the machining shape element 45 to perform the rough machining in the order of the machining shape element 46, the machining shape element 48, the machining shape element 42, the machining shape element 41, the machining shape element 44, and the machining shape element 51. Subsequently, after the machining conditions are switched to the core fixing machining, as shown in (b), a machining process for subjecting the machining shape element 52 to the core fixing machining is executed. After the shape 2 is removed, as shown in (c), a machining process is executed to perform the finishing in the order of the machining shape element 51, the machining shape element 44, the machining shape element 41, the machining shape element 42, the machining shape element 48, and the machining shape element 52. Note that the machining processes forming the procedure of (c) are collectively executed after all cores are removed.

Figure 19:
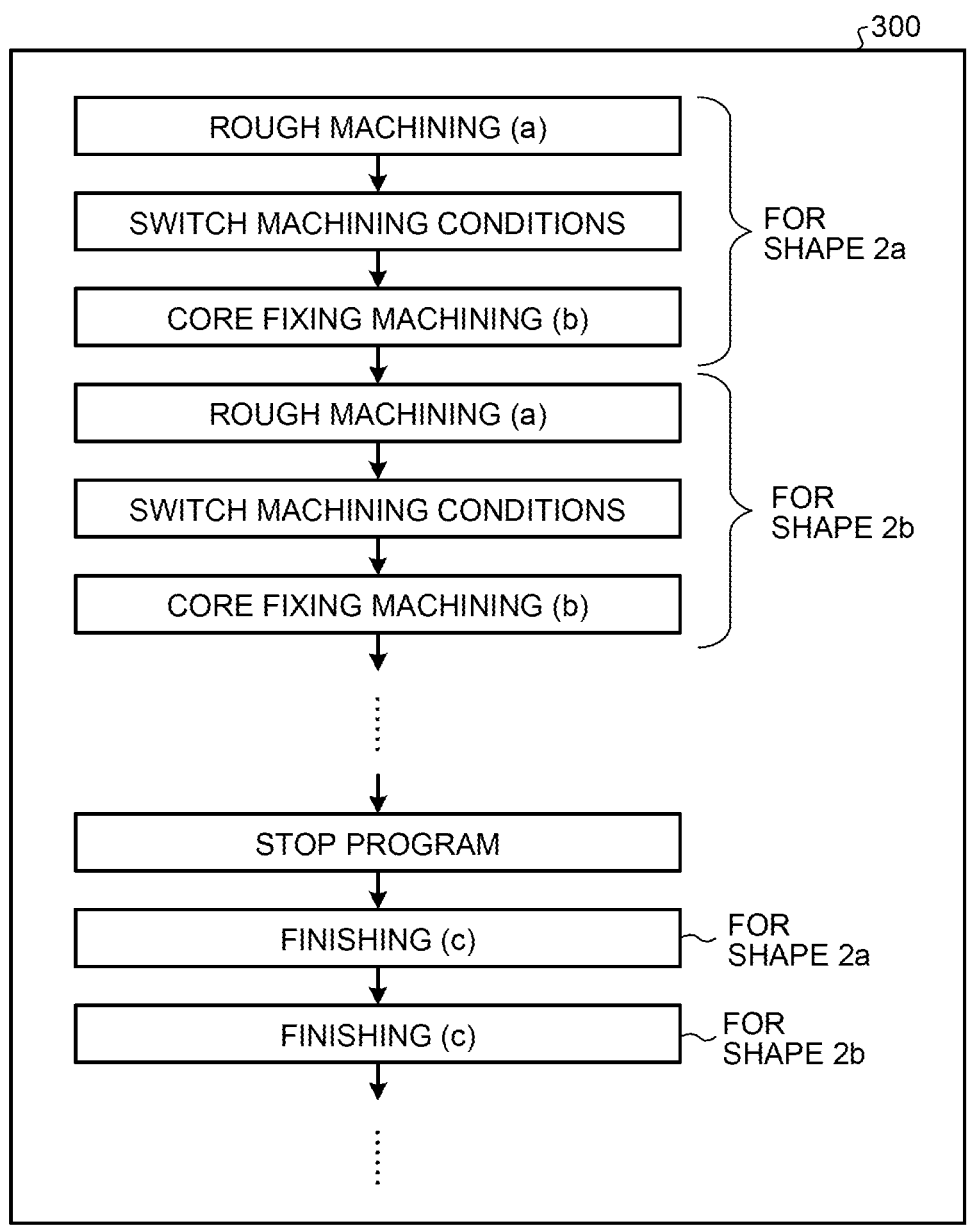
FIG. 19 is a diagram of an NC machining program for executing the die machining.

FIG. 19 is a diagram of the NC machining program 300 for executing the die machining. As shown in the figure, with the NC machining program 300, a series of machining processes for, after the rough machining, switching the machining conditions and performing the core fixing machining are executed for each of the shapes 2. After the series of machining processes are executed for all the shapes 2, the finishing is executed for each of the shapes 2. In this way, the approach machining and the retreat machining for the core fixing machining are omitted, and rather than temporarily stopping the execution of the own program 300 for each of the cores, it is possible to temporarily stop the execution of the own program 300 and urge removal of the cores after the core fixing machining is completed for all the cores. Therefore, it is possible to efficiently perform the die machining compared with the NC machining program generated by the technology according to the comparative example.

As explained above, according to the embodiment of the present invention, the input receiving unit 121 receives designation of a part where the core fixing machining is performed in a target shape forming a core and generates, from the target shape, the machining shape elements including the machining shape element 52 designated as the part where the core fixing machining is performed and the machining shape element 51 for which the core fixing machining is not performed. The machining-condition/machining-process setting unit 122 sets the machining conditions for performing the core fixing machining in the machining shape element 52 and sets the machining conditions for performing the rough machining or the finishing in the machining shape element 51. The NC-machining-program generating unit 123 generates the NC machining program 300 for, after subjecting the machining shape element 51 to the rough machining or the finishing, subsequently subjecting the machining shape element 52 to the core fixing machining. Therefore, before the machining shape element 52 is subjected to the core fixing machining, the NC machining program 300 does not perform useless operations for stopping the own program 300 and performing the approach machining. That is, the CAM apparatus 100 in the embodiment of the present invention can generate the NC machining program 300 for efficiently executing the core fixing machining.

The input receiving unit 121 receives an input for designating whether the machining is the die machining or the punch machining. When the die machining is designated, the NC-machining-program generating unit 123 generates the NC machining program 300 for, after subjecting all the machining shape elements (the machining shape elements 48, 42, 41, and 44) forming the outer periphery of the shape 2 excluding the machining shape element 52 to the rough machining and subjecting the machining shape element to the core fixing machining, temporarily stopping the own program 300 and, after resumption of the own program 300, for the work after a core is removed, subjecting the machining shape elements 48, 42, 41, 44, 51, and 52 to the finishing. When the punching is designated, the NC-machining-program generating unit 123 generates the NC machining program 300 for subjecting all the machining shape elements (the machining shape elements 48, 42, 41, and 44) forming the outer periphery of the shape 2 excluding the machining shape element 52 to the rough machining, after the rough machining, subjecting all the machining shape elements (the machining shape elements 48, 42, 41, and 44) forming the outer periphery of the shape 2 excluding the machining shape element 52 to the finishing, and, thereafter, continuously subjecting the machining shape element 52 to the core fixing machining. Therefore, the operator can generate, simply by performing an input for designating a machining type, the NC machining program 300 for automatically performing machining in machining order with useless operations being reduced.

When a plurality of machining target cores are present, when the punching is designated, the NC-machining-program generating unit 123 generates the NC machining program 300 for temporarily stopping the own program 300 after the core fixing machining is completed for the plurality of cores. Therefore, the CAM apparatus 100 can generate the NC machining program 300 with useless operations being reduced compared with the technology according to the comparative example for generating a machining program that is temporarily stopped for each of the cores.

INDUSTRIAL APPLICABILITY

As explained above, the machining-program generating apparatus, the machining-program generating method, and the recording medium according to the present invention are suitably applied to a machining-program generating apparatus and a machining-program generating method for generating an NC machining program for performing numerical machining of a wire electric discharge machining apparatus and a computer-readable recording medium having recorded herein a program for generating the NC machining program.

REFERENCE SIGNS LIST 1, 2, 2a to 2d Shapes
4 RAM
5 ROM
6 Input device
7 Display device
8 Machining-program generating program
21 Machining shape
22 Initial hole
23 Approach route
24 Section
25 Approach hole
26 to 28 Routes
41 to 48, 51, 52 Machining shape elements
49 Cursor
50 Endpoint
100 CAM apparatus
110 CAD function unit
120 CAM function unit
121 Input receiving unit
122 Machining-condition/machining-process setting unit
123 NC-machining-program generating unit
130 Target-shape-data storing unit
140 Machining condition database
200 Setting input
300 NC machining program
600 List information

The invention claimed is:

1. A machining-program generating apparatus that generates a machining program to operate a wire electric discharge machining apparatus, the machining-program generating apparatus comprising:
a processor configured to:
receive designation of a part where core fixing machining is performed in a machining shape forming a core and divides, on the basis of content of the received designation, the machining shape into machining shape elements including a first machining shape element for which the core fixing machining is performed and, a second machining shape element for which the core fixing machining is not performed, the second machining shape element being connected to one end of the first machining shape element, and a third machining shape element for which the core fixing machining is not performed, the third machining shape element being connected to the other end of the first machining shape element,
to allocate a first electric condition for the core fixing machining to the first machining shape element and a second electric condition different from the first electric condition to the second and third machining shape elements, and
to generate a machining program to machine the second machining shape element under the second electric condition and continuously machine the first machining shape element under the first electric condition after the machining of the second machining shape element, and, thereafter, machine the third machining shape element under the second electric condition, or to generate the machining program to machine the second machining shape element under the second electric condition, thereafter, machine the third machining shape element under the second electric condition, and continuously machine the first machining shape element under the first electric condition after the machining of the third machining shape element.

2. The machining-program generating apparatus according to claim 1, wherein the second electric condition is an electric condition for rough machining or an electric condition for finishing.

3. The machining-program generating apparatus according to claim 2, wherein processor is configured to:
receive an input for designating whether the machining is die machining or punching,
generate, when the die machining is designated, a first machining program for, after machining all the machining shape elements excluding the first machining shape element in the machining shape forming the core under an electric condition for the rough machining and machining the first machining shape element under the second electric condition, temporarily stopping the machining program, and, after resuming the machining program, machining, for the work after the core is removed, the second machining shape element under an electric condition for finishing, and
generate, when the punching is designated, a second machining program for machining all the machining shape elements excluding the first machining shape element in the machining shape forming the core under the electric condition for the rough machining, and after the machining under the electric condition for the rough machining, machining all the machining shape elements excluding the first machining shape element in the machining shape forming the core under the electric condition for the finishing, and, thereafter, continuously machining the first machining shape element under the first electric condition.

4. The machining-program generating apparatus according to claim 3, wherein, when a plurality of machining target cores are present, the first machining program temporarily stops the own program after the machining under the second electric condition is completed for the plurality of cores.

5. A machining-program generating method for generating a machining program to operate a wire electric discharge machining apparatus the machining-program generating method comprising:
performing via a processor the following steps:
receiving designation of a part where core fixing machining is performed in a machining shape forming a core;
dividing, on the basis of content of the received designation, the machining shape into machining shape elements including a first machining shape element for which the core fixing machining is performed and, a second machining shape element for which the core fixing machining is not performed, the second machining shape element being connected to one end of the first machining shape element, and a third machining shape element for which the core fixing machining is not performed, the third machining shale element being connected to the other end of the first machining shape element;
allocating a first electric condition for the core fixing machining to the first machining shape element and allocating a second electric condition different from the first electric condition to the second and third machining shape elements; and
generating a machining program to machine the second machining shape element under the second electric condition and continuously machine the first machining shape element under the first electric condition after the machining of the second machining shape element, and, thereafter, machine the third machining shape element under the second electric condition, or generating the machining program to machine the second machining shape element under the second electric condition, thereafter, machine the third machining shape element under the second electric condition, and continuously machine the first machining shape element under the first electric condition after the machining of the third machining shape element.

6. The machining-program generating method according to claim 5, wherein the second electric condition is an electric condition for rough machining or an electric condition for finishing.

7. The machining-program generating method according to claim 6, further comprising receiving, by the processor, an input for designating whether the machining is die machining or punching, wherein the generating the machining program includes:

generating, when the die machining is designated, a first machining program to temporarily stop the machining program, after machining all machining shape elements excluding the first machining shape element in the machining shape forming the core under an electric condition for the rough machining and machining the first machining shape element under the second electric condition, and, after resuming the machining program, machine, for the work after the core is removed, the second machining shape element under an electric condition for finishing, and generating, when the punching is designated, a second machining program to machine all the machining shape elements excluding the first machining shape element in the machining shape forming the core under the electric condition for the rough machining, and after the machining under the electric condition for the rough machining, machine all the machining shape elements excluding the first machining shape element in the machining shape forming the core under the electric condition for the finishing, and, thereafter, continuously machine the first machining shape element under the first electric condition.

8. The machining-program generating method according to claim 7, wherein, when a plurality of machining target cores are present, the first machining program temporarily stops the own program after the machining under the second electric condition is completed for the plurality of cores.

9. A non-transitory computer-readable recording medium having recorded thereon a plurality of commands for causing a computer to generate a machining program to operate wire a electric discharge machining apparatus, the machining program causing the computer to execute a method comprising:

receiving designation of a part where core fixing machining is performed in a machining shape forming a core;

dividing, on the basis of content of the received designation, the machining shape into machining shape elements including a first machining shape element for which the core fixing machining is performed and, a second machining shape element for which the core fixing machining is not performed, the second machining shape element being connected to one end of the first machining shape element, and a third machining shape element for which the core fixing machining is not performed, the third machining shape element being connected to the other end of the first machining shape element;

allocating a first electric condition for the core fixing machining to the first machining shape element and allocating a second electric condition different from the first electric condition to the second and third machining shape elements; and generating a machining program to machine the second machining shape element under the second electric condition and continuously machine the first machining shape element under the first electric condition after the machining of the second machining shape element, and, thereafter, machine the third machining shape element under the second electric condition, or generating the machining program to machine the second machining shape element under the second electric condition, thereafter, machine the third machining shape element under the second electric condition, and continuously machine the first machining shape element under the first electric condition after the machining of the third machining shape element.

* * * * *